No. 866,866. PATENTED SEPT. 24, 1907.
F. JOTTRAND.
APPARATUS FOR CUTTING METAL ARTICLES.
APPLICATION FILED SEPT. 15, 1906.

Witnesses:
William Dorman, Jr.
May Bird

Inventor:
Felix Jottrand
by Rosenbaum & Stockridge attys

UNITED STATES PATENT OFFICE.

FELIX JOTTRAND, OF UCCLE, NEAR BRUSSELS, BELGIUM.

APPARATUS FOR CUTTING METAL ARTICLES.

No. 866,866.           Specification of Letters Patent.           Patented Sept. 24, 1907.

Original application filed August 22, 1905, Serial No. 275,207. Divided and this application filed September 15, 1906. Serial No. 334,734.

*To all whom it may concern:*

Be it known that I, FELIX JOTTRAND, engineer, a subject of the King of Belgium, residing at Uccle, near Brussels, Kingdom of Belgium, have invented certain new and useful Improvements in Apparatus for Cutting Metal Articles, of which the following is a full, clear, and exact description.

This application is a division of my former application on method of cutting plates, pipes and other metal articles, upon which Letters Patent No. 831,078 were granted September 18th, 1906.

My invention relates to apparatus for cutting metal articles, such as plates, pipes and the like, the object of the same being to provide means whereby such articles, particularly those of iron and other readily oxidizable metals, may be cut almost instantaneously.

The improved apparatus comprises means for heating the object to be cut along the line of section and means for simultaneously directing upon said line of section a jet of oxygen under pressure for effecting the cutting of the object by chemical action upon the heated part. The metal is raised to such a temperature as to enable oxidation to take place rapidly without fusion of the metal, while the oxids, which are more fusible than the metal itself, flow readily, and the severance is as clean as if the metal had been sawed.

The details of my invention will hereinafter appear and that which I regard as new will be set forth in the claims.

Figure 1:
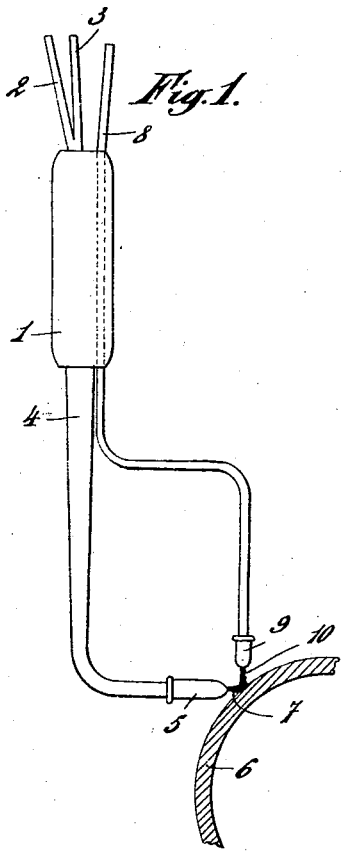
Figure 2:
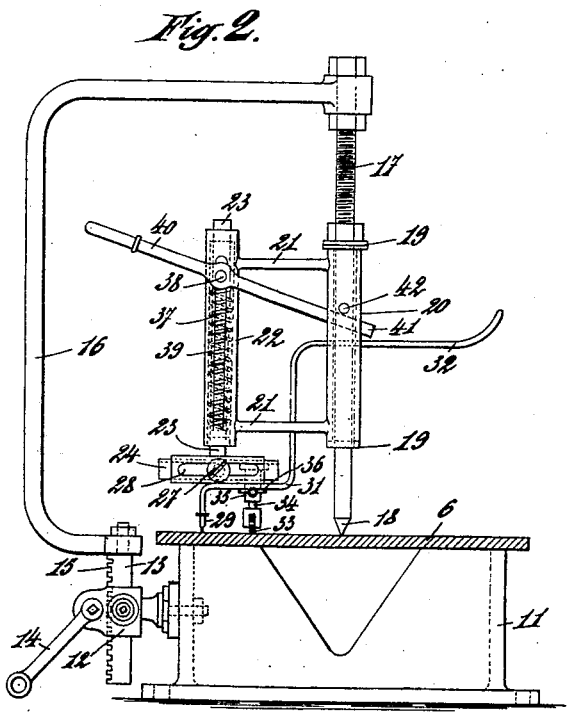
Figure 3:
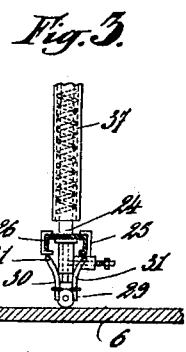

In the drawings: Figure 1 is an elevation of a simple form of my improved apparatus which may be employed under some circumstances. Fig. 2 is a side elevation of a more complete form of my improved apparatus; Fig. 3 is a detail view partly in section, showing the support for the nozzles of the heating and oxidizing devices, and the adjustable plates upon which said nozzles are mounted, and Fig. 4 is a fragmentary view similar to Fig. 2, showing the application of the invention to the cutting of holes in cylindrical objects.

When the work does not require any great amount of precision or when the contours to be cut are relatively complicated, an ordinary blow pipe 1 (Fig. 1) may be employed provided with separate inlets 2—3 for the oxygen and hydrogen opening into a mixing chamber 4 provided with a nozzle 5 directing a heating jet 7 upon the object 6 which it is desired to cut. To this blow pipe 1 is fixed a special conduit 8 conducting oxygen under pressure to a nozzle 9 arranged and regulated relatively to the heating nozzle in such a manner as to direct a jet 10 of oxygen to the point which has been raised to the proper temperature by the heating flame 7. This jet of oxygen consequently cuts said object without producing a seam, without appreciable loss of metal along a perfectly regular line, it being only necessary to cause the blow pipe nozzles to follow the contour to be cut.

Figure 4:
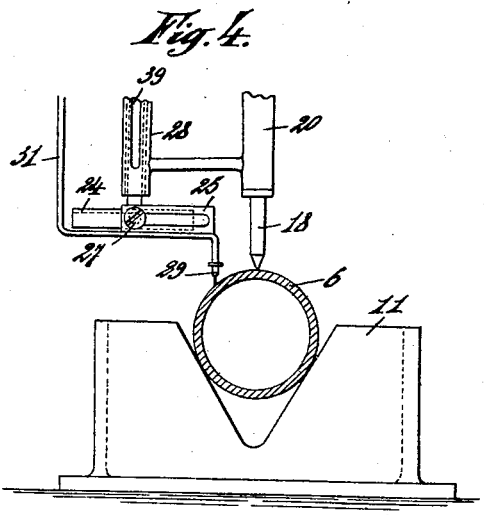

In cases in which it is desired to cut orifices or holes of a regular contour, as for example, of circular form, I may employ apparatus comprising a frame 11 upon which the object 6 to be cut is placed (Figs. 2—4). To this frame is secured laterally a support 12 through which passes a rod 13, the height of which may be altered at will by means of a small pinion actuated by a crank 14 and engaging in a rack 15 cut in said rod 13. This rod 13 carries on an arm 16 an adjustable screw-threaded centering rod 17 terminating in a center point 18 intended to rest upon the article to be treated and to determine the center of the orifice to be cut. Upon this rod 17 is mounted a tube 20 freely rotatable between two collars 19 and having arms 21 carrying a tube 22 through which passes a rod 23 carrying at its lower part a support 24 upon the sides of which are two slidable plates 25—26 whose position upon said support 24 can be fixed by set screws 27 passing through slots 28. One of the plates 25, carries the heating nozzle 29 and the other 26 the cold or oxygen nozzle 30, said nozzles being fixed to the ends of metal pipes 31 connected with flexible tubes 32 one of which supplies the mixture of oxygen and hydrogen to the heating nozzle 29, and the other the oxygen to the cold nozzle 30. The aforesaid support 24 may be provided with a guide roller 33 carried by a rod 34 entering a guide 35 fixed to the support 24, the position of this roller 33 being regulated by a set screw 36 acting upon the rod 34 that carries the guide roller. The rod 23 that carries the said support 24 is subjected to the action of a spring 37 which tends to lift it and is also provided with a pin 38 sliding in longitudinal grooves 39 of the tube 22; the pin 37 carries a rocking lever 40 the free end 41 of which is adapted to be engaged by a pin 42 fixed upon the aforesaid rotatable tube 20 in such a manner that it is only necessary to exert pressure upon the outer end of the rocking lever 40 to depress the supporting rod 23 in opposition to the spring and thus cause the roller 33 to rest on the object which is to be cut. The apparatus as a whole is then able to rotate around the screw-threaded rod 17 while the roller 33 travels over the work 6. It is thus only necessary to regulate the positions of the slidable plates 25, 26 relatively to the center of the orifice to be cut in order to exactly fix the radius of said orifice. The distance of the nozzles 29, 30 from the work may be exactly regulated by adjusting the height of the roller. The apparatus being ready to operate and the supporting rod 23 being depressed by its lever 40 in such manner as to cause the roller 33 to rest upon the work, it is only necessary to cause the apparatus as a whole to rotate slowly around the screw-threaded rod 17 and cause the nozzles to describe a circle around the point 18 in order to cut uniformly a circle of the desired diameter.

The apparatus lends itself to operations of all kinds, the position of the nozzles 29, 30 being capable of adjustment at will by the simple displacement of the slidable plates 25, 26.

The lifting and lowering of the nozzles 29, 30, by means of the lever 40, permit of effecting the cutting not only in one and the same horizontal plane, but also in any given direction as, for example, when cutting holes in tubes and shaping ends of tubes to correspond with such openings.

Fig. 4 shows the use of the apparatus for cutting a hole in a pipe or tube. In such case the tube 6 would be placed in the recess in the frame 11 and support the center point 18, the blow pipes rotating around this point 18 and being raised and lowered at the proper moment in the way above indicated.

Having described my invention, I claim:—

1. In an apparatus for cutting metallic articles, means for heating the article to be cut, and means for simultaneously supplying oxygen under pressure to the heated portion of the article.

2. In an apparatus for cutting metallic articles, means for directing a jet of a heating agent upon the article to be cut, and means for simultaneously directing a jet of an oxidizing agent upon the heated portion of the article.

3. In an apparatus for cutting metallic articles, means for heating the article to be cut, means for simultaneously supplying oxygen, under pressure, to the heated portion of the article, and means for causing the heating means and the oxygen-supplying means to follow the contour of the cut to be made.

4. In an apparatus for cutting metallic articles, means for directing a jet of a heating agent upon the article to be cut, means for simultaneously directing a jet of an oxidizing agent upon the heated portion of the article, and means for causing both means to follow the contour of the cut to be made.

5. In an apparatus for cutting metallic articles, a blow pipe having a discharge nozzle for directing a jet of a heating agent upon the article to be cut, a conduit for an oxidizing agent having a discharge nozzle adjacent to the nozzle of said blow pipe, and a common support for said nozzles.

6. In an apparatus for cutting metallic articles, a blow pipe having a discharge nozzle for directing a jet of a heating agent upon the article to be cut, a conduit for an oxidizing agent having a discharge nozzle adjacent to the nozzle of said blow pipe, and a movable support for said nozzles.

7. In an apparatus for cutting metallic articles, a blow pipe having a discharge nozzle for directing a jet of a heating agent upon the article to be cut, a conduit for an oxidizing agent having a discharge nozzle adjacent to the nozzle of said blow pipe, a common support for said nozzles, and means for independently adjusting the positions of said nozzles on said support.

8. In an apparatus for cutting metallic articles, a blow pipe having a discharge nozzle for directing a jet of a heating agent upon the article to be cut, a conduit for an oxidizing agent having a discharge nozzle adjacent to the nozzle of said blow pipe, a movable support for said nozzles, and means for guiding said support in its movements in accordance with the contour of the cut to be made.

9. In an apparatus for cutting metallic articles, a blow pipe having a discharge nozzle for directing a jet of a heating agent upon the article to be cut, a conduit for an oxidizing agent having a discharge nozzle adjacent to the nozzle of said blow pipe, a centering rod, and a support for said nozzles mounted upon said centering rod and adapted to rotate about the same.

10. In an apparatus for cutting metallic articles, a blow pipe having a discharge nozzle for directing a jet of a heating agent upon the article to be cut, a conduit for an oxidizing agent having a discharge nozzle adjacent to the nozzle of said blow pipe, a centering rod, means for raising and lowering said rod, and a support for said nozzles mounted upon said centering rod and adapted to rotate about the same.

11. In an apparatus for cutting metallic articles, a base or frame for supporting the article to be cut, a bracket arm mounted on said frame, means for raising and lowering said arm, an adjustable centering rod carried by said bracket arm, a tube or sleeve rotatably mounted on said rod, a blow pipe having a discharge nozzle for directing a jet of a heating agent upon the article to be cut, a conduit for an oxidizing agent having a discharge nozzle adjacent to the nozzle of said blow pipe, and a common support for said nozzles connected with said sleeve.

12. In an apparatus for cutting metallic articles, a base or frame for supporting the article to be cut, a bracket arm mounted on said frame, means for raising and lowering said arm, an adjustable centering rod carried by said bracket arm, a tube or sleeve rotatably mounted on said rod, a blow pipe having a discharge nozzle for directing a jet of a heating agent upon the article to be cut, a conduit for an oxidizing agent having a discharge nozzle adjacent to the nozzle of said blow pipe, a common support for said nozzles, and means for independently adjusting the position of said nozzles on said support.

13. In an apparatus for cutting metallic articles, a blow pipe having a discharge nozzle for directing a jet of a heating agent upon the article to be cut, a conduit for an oxidizing agent having a discharge nozzle adjacent to the nozzle of said blow pipe, a common support for said nozzles, means for guiding said support in its movements in accordance with the contour of the cut to be made, and means for forcing and holding said support to a position adjacent to the article to be cut.

14. In an apparatus for cutting metallic articles, a blow pipe having a discharge nozzle for directing a jet of a heating agent upon the article to be cut, a conduit for an oxidizing agent having a discharge nozzle adjacent to the nozzle of said blow pipe, a common support for said nozzles, a centering device about which said support is adapted to be revolved, a spring for raising said support, and means, acting in opposition to said spring, for forcing and holding said support to a position adjacent to the article to be cut.

15. In an apparatus for cutting metallic articles, a blow pipe having a discharge nozzle for directing a jet of a heating agent upon the article to be cut, a conduit for an oxidizing agent having a discharge nozzle adjacent to the nozzle of said blow pipe, a common support for said nozzles, a centering device about which said support is adapted to be revolved, a spring acting upon said support to raise it, a guide for limiting the downward movement of said support, and means acting in opposition to said spring for forcing and holding said support to a position adjacent to the article to be cut.

16. In an apparatus for cutting metallic articles, a blow pipe having a discharge nozzle for directing a jet of a heating agent upon the article to be cut, a conduit for an oxidizing agent having a discharge nozzle adjacent to the nozzle of said blow pipe, a common support for said nozzles, a centering device about which said support is adapted to be revolved, a spring acting upon said support to raise it, a roller adjustably mounted on said support for limiting the downward movement thereof, and a lever for forcing and holding said support to a position adjacent to the article to be cut.

17. In an apparatus for cutting metallic articles, a base or frame for supporting the article to be cut, a bracket arm mounted on said frame, means for raising and lowering said arm, an adjustable centering rod carried by said bracket arm, a tube or sleeve rotatably mounted on said rod, a blow pipe having a discharge nozzle for directing a jet of a heating agent upon the article to be cut, a conduit for an oxidizing agent having a discharge nozzle adjacent to the nozzle of said blow pipe, a common support for said nozzles having an upwardly extending rod thereon, a sleeve surrounding the latter rod and connected to said tube, a spring acting upon said rod for raising said support, a lever on said rod, and a projection on said tube adapted to be engaged by, and serving as a fulcrum for, said lever whereby said support may be forced and held down adjacent to the article to be cut.

18. In an apparatus for cutting metallic articles, a base or frame for supporting the article to be cut, a bracket arm mounted on said frame, means for raising and lowering said arm, an adjustable centering rod carried by said bracket arm, a tube or sleeve rotatably mounted on said rod, a blow pipe having a discharge nozzle for directing a jet of a heating agent upon the article to be cut, a conduit for an oxidizing agent having a discharge nozzle adjacent to the nozzle of said blow pipe, a common support for said nozzles having an upwardly extending rod thereon, independently adjustable plates on the sides of said support to which said nozzles are respectively attached, a sleeve surrounding the rod on said support and connected to said tube, a spring for holding said support in raised position, a lever connected with said rod and a projection on said tube adapted to be engaged by, and serving as a fulcrum for, said lever, whereby said support may be forced and held down to a position adjacent to the article to be cut.

In witness whereof, I subscribe my signature, in the presence of two witnesses.

FELIX JOTTRAND.

Witnesses:
L. COLINET,
Z. VAN BAEKEL.